(12) United States Patent
Benito Gutiérrez et al.

(10) Patent No.: US 8,506,001 B2
(45) Date of Patent: Aug. 13, 2013

(54) COATED ARTICLE INCLUDING LOW-E COATING WITH IMPROVED DURABILITY AND/OR METHODS OF MAKING SAME

(75) Inventors: Guillermo Benito Gutiérrez, Pamplona (ES); Javier Unquera Algorri, Saragossa (ES); Angel Alvarez Rodriguez, Tudela (ES); Jose Marcos Renes, Burgos (ES)

(73) Assignee: Centre Luxembourgeois de Recherches pour le Verre et la Ceramique S.A. (C.R.V.C.), Luxembourg (LU)

( * ) Notice: Subject to any disclaimer, the term of this patent is extended or adjusted under 35 U.S.C. 154(b) by 125 days.

(21) Appl. No.: 13/183,833

(22) Filed: Jul. 15, 2011

(65) Prior Publication Data

US 2013/0015677 A1 Jan. 17, 2013

(51) Int. Cl.
*B32B 17/06* (2006.01)
*B32B 9/04* (2006.01)

(52) U.S. Cl.
USPC .......... 296/84.1; 296/201; 428/428; 428/432

(58) Field of Classification Search
USPC ......... 428/432, 469, 689, 702, 428; 296/201, 296/96.22, 84.1
See application file for complete search history.

(56) References Cited

U.S. PATENT DOCUMENTS

| | | | |
|---|---|---|---|
| 5,201,926 A | 4/1993 | Szczyrbowski et al. | |
| 5,376,455 A | 12/1994 | Hartig et al. | |
| 5,584,902 A | 12/1996 | Hartig et al. | |
| 5,718,980 A * | 2/1998 | Koch et al. | 428/428 |
| 5,915,780 A * | 6/1999 | Kobrehel et al. | 296/146.15 |
| 6,475,626 B1 | 11/2002 | Stachowiak | |
| 6,605,358 B1 * | 8/2003 | Stachowiak | 428/432 |
| 6,748,706 B2 * | 6/2004 | Gaiser et al. | 52/208 |
| 7,147,924 B2 * | 12/2006 | Stachowiak | 428/428 |
| 7,153,578 B2 * | 12/2006 | Chonlamaitri et al. | 428/428 |
| 2004/0183342 A1 * | 9/2004 | Paetz et al. | 296/216.09 |
| 2004/0197574 A1 | 10/2004 | Stachowiak | |
| 2005/0202255 A1 | 9/2005 | Lemmer et al. | |

(Continued)

FOREIGN PATENT DOCUMENTS

| | | |
|---|---|---|
| EP | 0 963 960 | 12/1999 |
| EP | 1 736 454 | 12/2006 |

(Continued)

OTHER PUBLICATIONS

International Search Report mailed Oct. 5, 2012.

*Primary Examiner* — Glenn Dayoan
*Assistant Examiner* — Sunsurraye Westbrook
(74) *Attorney, Agent, or Firm* — Nixon & Vanderhye P.C.

(57) ABSTRACT

This application relates to a coated article including at least one infrared (IR) reflecting layer of a material such as silver or the like in a low-E coating. In certain embodiments, at least one layer of the coating is of or includes zirconium oxide (e.g., $ZrO_2$) or zirconium silicon oxynitride (e.g., $ZrSiO_xN_y$). When a layer comprising zirconium oxide or zirconium silicon oxynitride is provided as the uppermost or overcoat layer of the coated article (e.g., over a silicon nitride based layer), this results in improved chemical and heat stability in certain example embodiments. Coated articles herein may be used in the context of insulating glass (IG) window units, vehicle windows, or in other suitable applications such as monolithic window applications, laminated windows, and/or the like.

26 Claims, 2 Drawing Sheets

(56) References Cited

U.S. PATENT DOCUMENTS

| | | |
|---|---|---|
| 2006/0046073 A1 | 3/2006 | Neuman et al. |
| 2006/0121290 A1 | 6/2006 | Chonlamaitri et al. |
| 2006/0159933 A1 | 7/2006 | Disteldorf et al. |
| 2007/0036986 A1 | 2/2007 | Chonlamaitri et al. |
| 2009/0324967 A1 | 12/2009 | Disteldorf et al. |

FOREIGN PATENT DOCUMENTS

| | | |
|---|---|---|
| WO | WO 2005/021456 | 3/2005 |
| WO | WO 2006/066101 | 6/2006 |
| WO | WO 2008/060453 | 5/2008 |
| WO | WO 2009/157970 | 12/2009 |

* cited by examiner

COATED ARTICLE INCLUDING LOW-E COATING WITH IMPROVED DURABILITY AND/OR METHODS OF MAKING SAME

This application incorporates by reference the entire contents of U.S. application Ser. No. 12/213,879, filed on Jun. 25, 2008.

This application relates to a coated article including at least one infrared (IR) reflecting layer of a material such as silver or the like in a low-E coating. In certain embodiments, at least one layer of the coating is of or includes zirconium oxide (e.g., $ZrO_2$), zirconium oxynitride, or zirconium silicon oxynitride (e.g., $ZrSiO_xN_y$). In certain example embodiments, the provision of a layer comprising zirconium oxide or zirconium silicon oxynitride permits a layer that has a high refractive index and ultraviolet (UV) absorption to be used. When a layer comprising zirconium oxide or zirconium silicon oxynitride is provided as the uppermost or overcoat layer of the coated article (e.g., over a silicon nitride based layer), it is possible to realize improved chemical and heat stability in certain example embodiments. Thus, in certain example embodiments, UV absorption for example may be improved if desired. Coated articles herein may be used in the context of insulating glass (IG) window units, vehicle windows, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, low emissivity (or low emittance), and/or low sheet resistance ($R_s$). High visible transmission may permit coated articles to be used in applications where these characteristics are desired such as in architectural or vehicle window applications, whereas low-emissivity (low-E), and low sheet resistance characteristics permit such coated articles to block significant amounts of IR radiation so as to reduce for example undesirable heating of vehicle or building interiors. Thus, typically, for coatings used on architectural glass to block significant amounts of IR radiation, high transmission in the visible spectrum is often desired. However, low transmittance and/or high reflectance in the IR and/or near IR part(s) of the spectrum is also desired to reduce for example undesirable heating of vehicle or building interiors.

Unfortunately, low-E coatings often do not block significant amounts of ultraviolet (UV) radiation. In other words, low-E coatings typically provide only moderate or negligible UV protection, since the materials used in the layer stacks are transparent for short wavelengths (e.g., below 400 nm). In particular, materials used in such layer stacks such as tin oxide and titanium oxide cannot provide adequate UV protection given the small thicknesses of such materials required for low-E coatings. Thus, even with such coatings are provided on windows such as IG windows or vehicle windows, significant amounts of UV radiation makes its way through the window and into the building or vehicle. UV radiation tends to damage furniture and other elements inside of buildings or vehicles.

Materials such as vanadium oxide and cerium oxide absorb significant amounts of UV radiation. However, while such materials are characterized by a very steep onset of absorption for UV radiation, the onset of radiation absorption occurs in significant part in the visible part of the spectrum thereby leading to a significant distortion of colors when look through such a coating (e.g., a yellow shift). Accordingly, viewing characteristics tend to be degraded when layers of such materials are used.

There also exists a need in the art for improved chemical stability (chemical durability) and heat stability (stability upon heat treatment such as thermal tempering).

In view of the above, it will be appreciated that there exists a need in the art for a coated article including a low-E coating which is capable of blocking at some UV radiation in an efficient manner. Certain example embodiments of this invention relate to a coated article which permits significant UV absorption properties to be achieved.

In certain example embodiments of this invention, it has surprisingly been found that the provision of a layer consisting essentially of, or comprising, zirconium oxide (e.g., $ZrO_2$), zirconium oxynitride, or zirconium silicon oxynitride (e.g., $ZrSiO_xN_y$) unexpectedly improves blocking (reflecting and/or absorption) of UV radiation in a manner which does not significantly degrade other optical properties of a coated article such as visible transmission and/or color. Surprisingly, when a layer comprising zirconium oxide or zirconium silicon oxynitride is provided as the uppermost or overcoat layer of the coated article (e.g., over a silicon nitride based layer), this results in improved chemical and heat stability in certain example embodiments.

In certain example embodiments of this invention, a layer of zirconium oxide or zirconium silicon oxynitride may be tuned in a manner so as to achieve a desired amount of UV blocking and/or absorption, as well as improved durability. It has been found that zirconium oxide or zirconium silicon oxynitride has optical constants (n and k) that allow adjustment of the onset of absorption by varying oxygen content of the layer for example. Moreover, it has been found that zirconium oxide, zirconium oxynitride, or zirconium silicon oxynitride has a refractive index (n) in a range which is very adaptable to low-E coatings, so that such layer(s) may be used in low-E coatings without significantly changing the visible appearance of the coated article or certain performance data. Thus, in certain example embodiments of this invention, the absorption edge of the curve defined by a layer of zirconium oxide or zirconium silicon oxynitride can be adjusted by changing the oxygen content thereof, which may be done for example by adjusting the amount of oxygen introduced into the sputtering chamber(s) during reactive sputter-deposition of the layer. In particular, for example, as oxygen content of the layer increases, the absorption edge of the curve defined by the layer of zirconium oxide or zirconium silicon oxynitride moves toward lower wavelengths away from certain visible wavelengths. Thus, in certain example embodiments, a balancing or tuning can be performed so as to achieve a desired balance between visible transmission and UV absorption.

In certain example embodiments of this invention, there is provided a coated article including a coating supported by a glass substrate, the coating comprising, in this order from the glass substrate outwardly: a first dielectric layer; a first contact layer; an infrared (IR) reflecting layer comprising silver located on the substrate over at least and contacting the first contact layer; a second contact layer comprising Ni and/or Cr located over and contacting the IR reflecting layer; a second dielectric layer comprising silicon nitride located over the second contact layer; and an overcoat dielectric layer comprises one or more of zirconium oxide, zirconium oxynitride, and/or zirconium silicon oxynitride located over and contacting the second dielectric layer comprising silicon nitride.

In certain example embodiments of this invention, there is provided a coated article including a coating supported by a glass substrate, the coating comprising, in order moving away from the glass substrate: a first dielectric layer comprising silicon nitride; a first contact layer comprising Ni and/or Cr; an infrared (IR) reflecting layer comprising silver located on the substrate over at least and contacting the first contact layer; a second contact layer comprising Ni and/or Cr located over and contacting the IR reflecting layer; a second dielectric layer comprising silicon nitride located over and contacting the second contact layer; and an overcoat layer comprising zirconium oxide. The first contact layer is 2.1-2.5 times thicker than the second contact layer, and the overcoat layer is at least 2 nm thick.

In certain example embodiments of this invention, there is provided a vehicle windshield. A coating is supported by a first glass substrate, the coating comprising, in order moving away from the glass substrate: a first dielectric layer comprising silicon nitride; a first contact layer comprising Ni and/or Cr; an infrared (IR) reflecting layer comprising silver located on the substrate over at least and contacting the first contact layer; a second contact layer comprising Ni and/or Cr located over and contacting the IR reflecting layer; a second dielectric layer comprising silicon nitride located over and contacting the second contact layer; and an overcoat layer comprising zirconium oxide. A second glass substrate is laminated to the first glass substrate such that the coating supported by the first substrate faces the second substrate. The first contact layer is 2.1-2.5 times thicker than the second contact layer, and the overcoat layer is at least 2 nm thick.

In certain example embodiments of this invention, methods of making these and/or other articles/windshields are provided. According to certain example embodiments, a coated article may be formed by only sputter depositing (e.g., not pyrolytically depositing) the above-described and/or other layers on a glass substrate. According to certain example embodiments, a polymer-based interlayer (e.g., other than PET and possible such as PVB) may be used as a laminate material in a windshield or other laminated-type assembly.

The features, aspects, advantages, and embodiments described herein may be combined in any suitable combination or sub-combination to yield yet further embodiments.

DETAILED DESCRIPTION OF EXAMPLE EMBODIMENTS OF THE INVENTION

Figure 1:
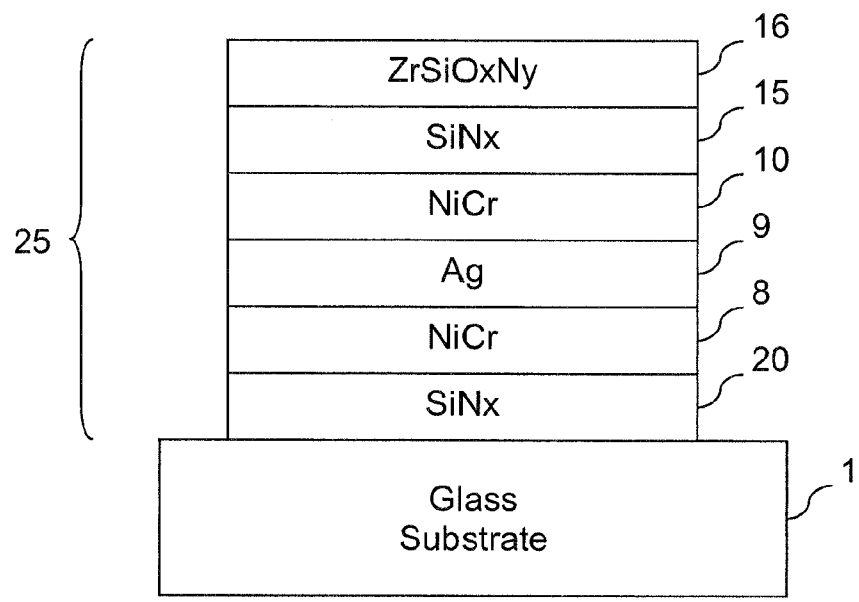
FIG. 1 is a cross-sectional view of a coated article according to an example embodiment of this invention.

Referring now to the drawings in which like reference numerals indicate like parts throughout the several views.

Coated articles herein may be used in coated article applications such as monolithic windows, IG window units, vehicle windows, and/or any other suitable application that includes single or multiple substrates such as glass substrates.

Certain embodiments of this invention relate to a coated article that includes at least one glass substrate supporting a coating. The coating typically has at least one infrared (IR) reflecting layer that reflects and/or blocks at least some IR radiation. The IR reflecting layer(s) may be of or include a material such as silver, gold, NiCr or the like in different embodiments of this invention. Often, an IR reflecting layer is sandwiched between at least first and second dielectric layers of the coating. In certain example embodiments of this invention, it has surprisingly been found that the provision of a layer 16 consisting essentially of, or comprising, zirconium oxide or zirconium silicon oxynitride (e.g., $ZrSiO_xN_y$) as a dielectric layer(s) of such a coating unexpectedly improves blocking (reflecting and/or absorption) of UV radiation in a manner which does not significantly degrade other optical properties of a coated article such as visible transmission and/or color. One or more such zirconium oxide or zirconium silicon oxynitride layers may be provided in a given coating in different embodiments of this invention. Moreover, such zirconium oxide or zirconium silicon oxynitride layer(s) may be provided in any type of solar control or low-E (low-emissivity, or low-emittance) coating in different embodiments of this invention (e.g., as an overcoat), and the specific low-E coatings described herein are for purposes of example only unless recited in the claim(s). When a layer comprising zirconium oxide or zirconium silicon oxynitride is provided as the uppermost or overcoat layer of the coated article (e.g., over a silicon nitride based layer), this results in improved chemical and heat stability in certain example embodiments. The use of a layer of zirconium oxide or zirconium silicon oxynitride in this respect (e.g., as an overcoat layer) has surprisingly been found to improve chemical stability and heat stability, and has also been found to be stable during sputtering processing.

In certain example embodiments of this invention, the oxygen content of the zirconium oxynitride or zirconium silicon oxynitride layer(s) 16 (e.g., see FIG. 1) is adjusted so that the zirconium silicon oxynitride inclusive layer has an index of refraction (n) (at a wavelength of 550 nm) of from about 1.6 to 2.8, more preferably from about 1.7 to 2.5, and even more preferably from about 1.8 to 2.4. Moreover, the oxygen content of the zirconium silicon oxynitride layer(s) 16 is adjusted so that the zirconium silicon oxynitride inclusive layer has an extinction coefficient (k) (at a wavelength of 550 nm) of no greater than about 2.3, more preferably no greater than about 2.0, even more preferably no greater than about 1.8. Tuning of the oxygen content of the zirconium silicon oxynitride 16 in such a manner has been found to permit good UV absorption to be achieved in combination while not significantly adversely affecting visible characteristics of the coated article. Moreover, tuning of the oxygen content in such a manner causes the zirconium silicon oxynitride to have a refractive index that is close to that of certain layers often used in low-E coatings such as oxides of Ti, Sn, Zn, and/or the like. As an example, the absorption edge of a zirconium silicon oxynitride layer 16 can be moved over a large wavelength range and may be positioned above, below, or substantially on a ZnO reference edge merely by changing the oxidation level of the layer thereby permitting it to substantially match ZnO from an optical perspective in certain example instances. Thus, such zirconium silicon oxynitride may replace part of all of such layers in low-E coatings in certain situations without significantly adversely affecting visible characteristics of the coated article. The achievable UV protection is largely dependent on the position of the absorption edge and the layer thickness required by the optical properties of the overall coating.

Moreover, in forming the zirconium silicon oxynitride layer(s) 16 according to certain example embodiments of this invention (e.g., via reactive sputtering), the ratio of nitrogen/oxygen (e.g., $N_2/O_2$) gas used in the sputter chamber is no greater than about 25, more preferably no greater than about 18, more preferably no greater than about 10. In certain example embodiments of this invention, the ratio of nitrogen/oxygen (e.g., $N_2/O_2$) gas used in the sputter chamber in forming a layer 16 of or including zirconium silicon oxynitride is from about 1 to 25, more preferably from about 2 to 18, and sometimes from about 2 to 10. Additionally, according to certain example embodiments of this invention, a zirconium silicon oxynitride layer 16 is characterized by a ratio of nitrogen to oxygen (atomic percent) therein of from about 1 to 25, more preferably from about 2 to 18, and sometimes from about 2 to 10. Of course, other gases such as Ar may also be used in the sputtering chamber along with oxygen and nitrogen when sputter depositing a layer of zirconium silicon oxynitride. In certain example embodiments, the amount of Ar gas used in sputtering is greater than the amount of oxygen but less than the amount of nitrogen used in forming a layer of zirconium oxynitride or zirconium silicon oxynitride 16. For example, in certain example embodiments, the gas ratio used in sputter depositing a layer of zirconium silicon oxynitride is 40 ml Ar, 55 ml $N_2$ and 10 ml $O_2$.

Moreover, in certain example embodiments of this invention, the peak of the refractive index curve for a layer of zirconium oxide or zirconium silicon oxynitride is at a wavelength shorter than about 400 nm, more preferably shorter than about 375 nm, and sometimes shorter than about 350 nm, and even sometimes shorter than about 300 nm. In addition to the aforesaid advantageous optical properties, zirconium oxide or zirconium silicon oxynitride layers according to different embodiments of this invention realize good mechanical and chemical durability. Thus, such layers may be suitable for use in base coats or overcoats in solar control and/or low-E coatings for example.

In certain example embodiments of this invention, the Zr/Si ratio (atomic percent) in an example zirconium oxynitride or zirconium silicon oxynitride layer may be from about 0.25 to 5.0, more preferably from about 0.5 to 4, even more preferably from about 0.75 to 3.0, and still more preferably from about 1.0 to 2.0, and most preferably from about 1.25 to 1.75. Thus, in certain example embodiments of this invention there is more Zr than Si in a layer of or including zirconium silicon oxynitride in terms of atomic percent. Moreover, in certain example embodiments, an example zirconium silicon oxynitride layer may be from about 20 to 400 Å thick, more preferably from about 40 to 300 Å thick, and even more preferably from about 50 to 250 Å thick. In certain example embodiments, the layer 16 of or including zirconium silicon oxynitride may be of or include from about 20-45% (more preferably 25-40%, most preferably from about 30-36%, or 33%) Si, from about 40-65% (more preferably 45-63%, most preferably from about 50-59%, or 54%) Zr, with the rest being made up of optional dopant such as Al and/or $Y_2O_3$. An example is about 60% Zr and about 40% Si, in layer 16 in the FIG. 1 embodiment. In certain example embodiments, the layer 16 (in either the FIG. 1 or FIG. 2 embodiment) includes from about 2-8% (more preferably from about 3-7%, or about 5%) Al, and from about 2-12% (more preferably from about 4-10%, or about 6-8%) $Y_2O_3$. It is noted that in the FIG. 1 embodiment, the layer 16 may instead be of zirconium nitride, zirconium oxide, or zirconium oxynitride.

As explained above, zirconium oxide or zirconium silicon oxynitride layers according to different example embodiments of this invention may be used in various locations in solar control coatings. The coatings described below are provided for purposes of example.

Figure 2:
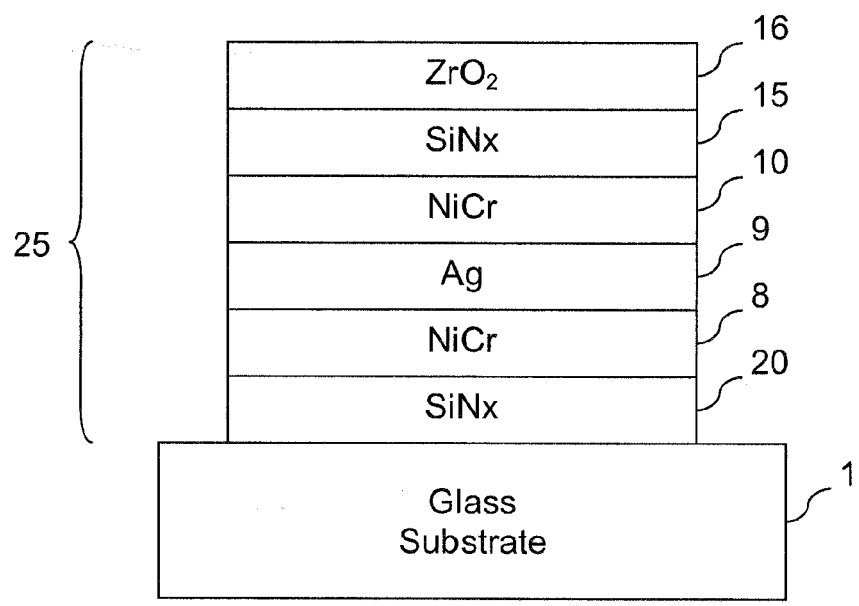
FIG. 2 is a cross-sectional view of a coated article according to another example embodiment of this invention.

FIGS. 1-2 are cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) provided on the substrate either directly or indirectly. As shown in FIG. 1, the coating 25 comprises dielectric layer 20, contact layer 8 of or including NiCr or an oxide of nickel chrome (e.g., NiCr or $NiCrO_x$), IR reflecting layer 9 including or of silver, gold, or the like, upper contact layer 10 of or including NiCr or an oxide of nickel chrome (e.g., NiCr or $NiCrO_x$), dielectric layer 15 (e.g., of or including silicon nitride), and dielectric layer 16 of or including a material such as zirconium oxide, zirconium oxynitride, or zirconium silicon oxynitride which may in certain example instances be a protective overcoat. Certain characteristics of the layer 16 are discussed above when the layer 16 is of or including zirconium silicon oxynitride. The zirconium oxide, zirconium oxynitride, or zirconium silicon oxynitride layer 16 may be doped (e.g., with Al or the like) in certain example embodiments of this invention. Other layers and/or materials may also be provided in certain example embodiments of this invention, and it is also possible that certain layers may be removed or split in certain example instances.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics such as low emittance, low sheet resistance, and so forth. The IR reflecting layer 9 may, however, be slightly oxidized in certain embodiments of this invention.

The upper and lower contact layers 8 and 10 may be of or include an oxide of Ni and/or Cr. In certain example embodiments, upper and lower contact layers 8, 10 may be of or include nickel (Ni), chromium/chrome (Cr), a nickel alloy such as nickel chrome (NiCr), Haynes alloy, an oxide of any of these, or other suitable material(s). For example, one of these layers may be of or include zinc oxide instead of NiCr. The use of, for example, NiCr in these layers allows durability to be improved in certain example instances, and the provided thicknesses permit low $\Delta E^*$ values to be achieved. Contact layers 8 and 10 (e.g., of or including Ni and/or Cr) may or may not be continuous in different embodiments of this invention across the entire IR reflecting layer. In certain example embodiments, one or both of the NiCr layers 8, 10 includes from about 70-81% Ni, from about 15-19% Cr, from about 3-6% Al, and possibly from about 0-4% (or 1-4%) Fe. An example is 76.5% Ni, 17% Cr, 4.3% Al, and optionally about 2.2% Fe, for one or both of layers 8, 10.

Dielectric layers 15 and 20 may be of or include silicon nitride (e.g., $Si_3N_4$) or any other suitable material in certain example embodiments of this invention such as silicon oxynitride. These layers are provided for durability purposes, and to protect the underlying layers, and also for antireflective purposes. In certain example embodiments, layers 15 and 20 each may have an index of refraction (n) of from about 1.9 to 2.2, more preferably from about 1.95 to 2.05.

It has been found that the provision of an overcoat layer 16 of or including zirconium oxide (e.g., see FIG. 2) can reduce and/or eliminate thermal stability problems. In particular, in certain example embodiments of this invention, the use of a zirconium oxide inclusive overcoat layer 16 in combination with the silicon nitride based layer 15 and contact layer 10 can result in a coated article which can be significantly heat treated (e.g., thermally tempered) without suffering from significant mottling damage or other damage from heat treatment (e.g., the coated article can realize acceptable visible transmission, a* and/or b* values following heat treatment such as thermal tempering). In certain example embodiments, the index "n" of the zirconium oxide layer 16 is from about 2.1 to 2.25, more preferably about 2.16 (at 550 nm).

It has been found that by using zirconium oxide or zirconium silicon oxynitride as a top or overcoat layer 16 with silicon nitride 15 underneath the same as shown in FIGS. 1-2, the coated article realizes a higher light transmission and a significant drop in sheet resistance—both of which are unexpected improvements/results. Unexpected UV advantages are also realized as discussed above, due to the use of zirconium oxide or zirconium silicon oxynitride. This embodiment may be heat treated (thermally tempered with the coating thereon) in certain example embodiments of this invention.

Other layer(s) below or above the illustrated coating 25 may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

The value(s) ΔE* is important in determining whether or not there is thermal stability, matchability, or substantial color matchability upon HT, in the context of certain embodiments of this invention (i.e., the term ΔE* is important in determining color stability upon HT). Color herein is described by reference to the conventional a*, b* values. For example, the term Δa* is indicative of how much color value a* changes due to HT. The term ΔE* (and ΔE) is well understood in the art. The definition of the term ΔE* may be found, for example, in WO 02/090281 and/or U.S. Pat. No. 6,475,626, the disclosures of which are hereby incorporated herein by reference. In particular, ΔE* corresponds to the CIE LAB Scale L*, a*, b*, and is represented by:

$$\Delta E^* = \{(\Delta L^*)^2 + (\Delta a^*)^2 + (\Delta b^*)^2\}^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

Above, the subscript "o" represents the coating (or coated article) before heat treatment and the subscript "1" represents the coating (or coated article) after heat treatment; and the numbers employed (e.g., a*, b*, L*) are those calculated by the aforesaid (CIE LAB 1976) L*, a*, b* coordinate technique. In a similar manner, ΔE may be calculated using equation (1) by replacing a*, b*, L* with Hunter Lab values ah, bh, Lh. Also within the scope of this invention and the quantification of ΔE* are the equivalent numbers if converted to those calculated by any other technique employing the same concept of ΔE* as defined above.

It has been found that thinning the NiCr layers 8 and 10 results in good (lower) ΔE* values compared to a situation where layers 8, 10 are not thinned. In certain example embodiments, the upper NiCr based layer 10 is thinner than the lower NiCr based layer 8. In certain example embodiments of this invention, NiCr based layers 8, 10 are thinned and the resulting coated article due to heat treatment has a ΔE* value (glass side reflective) of no more than 3.0, more preferably no more than 2.5, even more preferably no more than 2.0 and possibly no more than 1.5.

While various thicknesses may be used in different embodiments of this invention, example thicknesses and materials for the respective layers on the glass substrate 1 in the FIG. 1-2 embodiments are as follows, from the glass substrate outwardly:

TABLE 1

Example Materials/Thicknesses

| Layer | Range (Å) | More Preferred (Å) | Example (Å) |
|---|---|---|---|
| $Si_3N_4$ (layer 20) | 150-700 Å | 200-600 Å | 380 Å |
| NiCr (layer 8) | <=12 Å | <=10 Å | 7-8 Å |
| Ag (layer 9) | 30-170 Å | 40-110 Å | 67 Å |
| NiCr (layer 10) | <=11 Å | <=9 Å | 6-8 Å |
| $Si_3N_4$ (layer 15) | 150-700 Å | 200-600 Å | 365 Å |
| $ZrO_2$ or $ZrSiO_xN_y$ (layer 16) | 40-400 Å | 100-200 Å | 150 Å |

In certain example embodiments of this invention, coated articles herein may have the following low-E (low emissivity), solar and/or optical characteristics set forth in Table 2 when measured monolithically.

TABLE 2

Low-E/Solar Characteristics (Monolithic)

| Characteristic | General | More Preferred | Most Preferred |
|---|---|---|---|
| $R_s$ (ohms/sq.): | <=20.0 | <=15.0 | <=10.0 |
| $T_{vis}$ (%): | >=50 | >=60 | >=70 or 75 |

Moreover, coated articles including coatings according to certain example embodiments of this invention have the following optical characteristics (e.g., when the coating(s) is provided on a clear soda lime silica glass substrate 1 from 1 to 10 mm thick, preferably about 4 mm thick). In Table 3, all parameters are measured monolithically (before and/or after heat treatment).

TABLE 3

Example Optical Characteristics (Monolithic)

| Characteristic | General | More Preferred |
|---|---|---|
| $T_{vis}$ (or TY)(Ill. C, 2 deg.): | >=60% | >=70% or 75% |
| $a^*_t$ (Ill. C, 2°): | −6 to +6 | −3 to 0 |
| $b^*_t$ (Ill. C, 2°): | −10 to +10.0 | −4 to 0 |
| $L^*_t$: | >=89 | >=90 |
| $R_fY$ (Ill. C, 2 deg.): | <=10% | <=6% |
| $a^*_f$ (Ill. C, 2°): | −5 to +5 | −3 to +2 |
| $b^*_f$ (Ill. C, 2°): | −14.0 to +10.0 | −10.0 to +5 |
| $L^*_f$: | 22-30 | 24-27 |
| $R_gY$ (Ill. C, 2 deg.): | <=11% | <=7% |
| $a^*_g$ (Ill. C, 2°): | −7 to +7 | −2 to +2 |
| $b^*_g$ (Ill. C, 2°): | −10.0 to +10.0 | −2.0 to +7 |
| $L^*_g$: | 23-38 | 25-37 |

It has been observed that aftermarket applications, e.g., for vehicle windshields, often tend to involve harsher production environments as compared to OEM processes. Mechanical robustness of the thin film layer stack therefore is sometimes a concern because of the harsher environments. Thus, the inventors of the instant application have recognized that it would be desirable to provide a infrared reflecting layer that is more mechanically robust, e.g., so that it is better able to withstand the potentially harsher conditions that are present in aftermarket manufacturing environments. It is a challenge, however, to increase durability of a thin film layer stack, while at the same time maintaining the same or similar performance characteristics as compared to the OEM version of the coating. For instance, it is challenging to increase robustness of the thin film layer stack while maintaining visible transmission values greater than about 70% (A/2°), with solar direct transmission below 50%, in connection with a vehicle windshield application that involves an assembly including, in order from the outside of the vehicle in, glass/coating/polymer-based interlayer or other laminate/glass.

The inventors of the instant invention have discovered that mechanical robustness of the coating is dominated by the thickness of the zirconium-inclusive topcoat and the thickness relationship between the two layers comprising Ni and/or Cr sandwiching the Ag-based layer. In particular, the inventors have discovered that that good mechanical durability can be obtained by providing a layer comprising or consisting essentially of zirconium oxide with a thickness of greater than or equal to 2 nm (e.g., 2-5 nm, more preferably 2.5-4 nm, and with an example thickness of about 3 nm). The inventors also have observed that, of the two layers comprising Ni and/or Cr, it is the bottom layer that is primarily responsible for improving the mechanical robustness of the overall coating stack. The inventors have determined that it may be desirable in certain example embodiments to maintain the total thickness of both layers comprising Ni and/or Cr, provided that some of the Ni and/or Cr thickness from the top layer is shifted to the bottom layer. Various thickness bottom-to-top ratios are possible, with the thickness ratio of 2.0-2.6 being preferable, 2.1-2.5 being more preferable, and 2.2-2.4 being still more preferable. The bottom-to-top thickness ratio of about 2.3 has been found to be optimal in certain situations, e.g., when combined with a layer comprising or consisting essentially of ZrOx that is greater than or equal to about 2 nm.

The silicon-inclusive dielectrics may be run outside the absorption range in certain example implementations. In certain example embodiments, the ratios of nitrogen to oxygen (atomic or weight percent) may be greater than or equal to about 4, more preferably greater than or equal to about 5, and still more preferably greater than or equal to about 5.5, with an offset of 100-200 ml of nitrogen, more preferably 125-175 ml, and sometimes 140 ml. It is noted that one or both of the layers comprising Ni and/or may or may not be partially or fully nitrided and/or oxided in different embodiments of this invention, e.g., because of the way the silicon-inclusive dielectrics are run. In certain example embodiments, the nitrogen included in the contact layer(s) may be oxygen graded, e.g., so that there is more nitrogen proximate to the adjacent silicon nitride inclusive dielectric layer. Ratios of nitrogen may be kept low in certain example instances because it has been observed that it is sometimes difficult to control nitrogen across the cross-profile. For very thin layers of NiCr (e.g., of the sort used in connection with certain example embodiments described herein), the lack of a high degree of uniformity of nitrogen across the cross-profile has been found to have a significant impact on the overall color uniformity of the coating. Accordingly, ratios of nitrogen may be kept from about 1-30 ml/kw, more preferably from about 2-15 ml/kw, and still more preferably from about 2.5 to 10 ml/kw in certain example instances.

Figure 3:
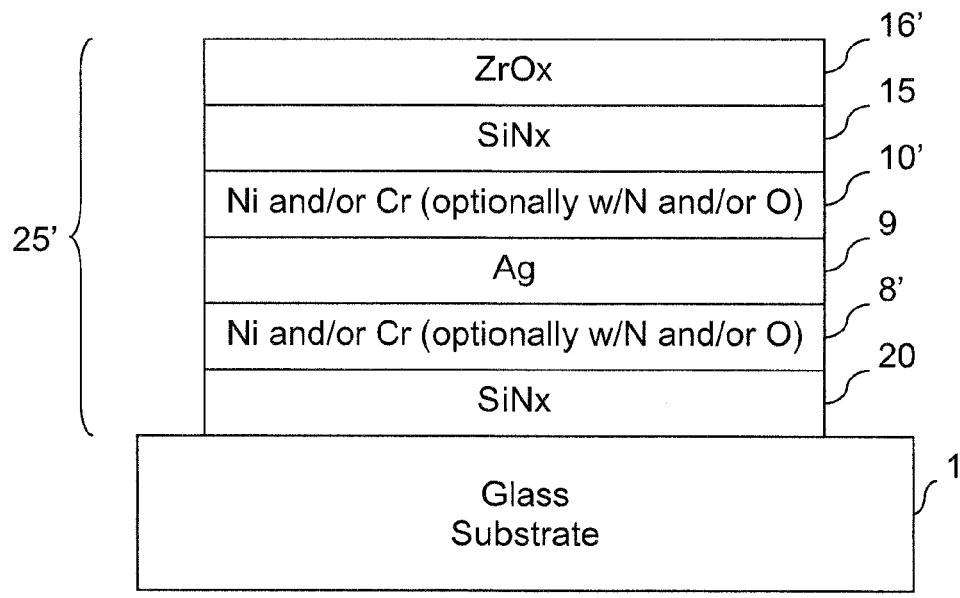
FIG. 3 is a cross-sectional view of a coated article according to another example embodiment of this invention.

FIG. 3 is a cross-sectional view of a coated article according to another example embodiment of this invention. FIG. 3 is similar to FIGS. 1 and 2. However, the overcoat layer shown in FIG. 3 is of or includes ZrOx, which may be fully oxidized or partially oxidized in different embodiments of this invention. In certain example embodiments, excess oxygen may be added in the coater or sputtering chamber of the coater to ensure that the overcoat comprises fully or substantially fully oxidized zirconium oxide. In addition, the contact layer(s) 8' and/or 10' may be of or include Ni and/or Cr, and may be fully or partially oxided and/or nitrided in different embodiments of this invention as indicated above. For instance, in certain example embodiments, one or both of the contact layer(s) 8' and/or 10' may be of or include NiCrN, with the layer(s) being only slightly nitrided. The lower contact layer 8' may be thicker (e.g., at least about two times as thick) as the upper contact layer 10' so as to improve durability in certain example embodiments. It has been found that the thinness of the upper contact layer may present uniformity problems in some cases. However, it has been observed that the uniformity of the layer may be improved by making it at least slightly nitridic. It also may perform better, e.g., as a contact layer, in such situations.

While various thicknesses may be used in different embodiments of this invention, example thicknesses and materials for the respective layers on the glass substrate 1 in the FIG. 3 embodiment are as follows, from the glass substrate outwardly:

TABLE 4

Example Materials/Thicknesses

| Layer | Range (nm) | More Preferred (nm) | Example (nm) |
|---|---|---|---|
| SiN (layer 20) | 1.5-70 | 20-60 | 40 |
| NiCr (layer 8') | 0.5-4.0 | 1.0-2.50 | 1.6 |
| Ag (layer 9) | 3-20 | 4-15 | 9 |
| NiCr (layer 10') | 0.2-2.0 | 0.5-1.5 | 0.7 |
| SiN (layer 15) | 1.5-80 | 20-70 | 50 |
| ZrOx (layer 16') | 2-5 | 2.5-4 | 3 |

Various durability tests were run on the coating 25' shown in FIG. 3. Samples typically passed normal abrasion tests in water using 500 cycles of hard and soft brushes, as well as a dry brush test involving 500 cycles with both hard and soft brushes. By contrast, these tests were failed when other layer stacks are used. Thus, certain example embodiments may be suitable for use in various aftermarket vehicle window applications. This level of robustness may be achieved by sputtering depositing all of the layers described above, thereby providing an alternative to conventional pyrolytically deposited coatings that often times are by their nature more mechanically durable. In certain example embodiments, none of the layers in the coating are pyrolytically deposited.

Table 5 below provides a direct comparison between certain products that are commercially available from the assignee of the instant invention and certain example embodiments. Although the products that are commercially available from the assignee of the instant invention perform well in the OEM market, further improvements would be desirable in connection with aftermarket applications. The ratings in Table 5 are based on 500 cycle dry brush tests (with both hard and soft brushes). The values range from 1-5, with 1 representing minimal damage (e.g., almost no damage) and 5 representing a very high degree of damage (e.g., complete or almost complete coating removal).

TABLE 5

Durability Comparison

| Product | Rating |
|---|---|
| ClimaGuard 1.4D | 3 |
| ClimaGuard 1.4D + ZrOx | 2 |
| ClimaGuard 1.4DT | 3 |
| SunGuard Neutral 67 HD | 1 |
| Example | 1 |

It is noted that ClimaGuard 1.4D and ClimaGuard 1.4DT are references for standard products without ZrOx inclusive overcoats. It also is noted that SunGuard Neutral 67 HD is a reference for a very high durability product that has no silver, substitutes NbZr for NiCr, and includes a ZrOx overcoat. As can be seen from Table 5, performance for certain example embodiments is similar to the extremely high durability coating. It also shows that influence of the NiCr balance, as ClimaGuard 1.4D with a ZrOx overcoat represents an improvement over ClimaGuard 1.4D without the ZrOx overcoat, but still does not perform as well as certain example embodiments (which involve balanced NiCr and a ZrOx overcoat).

In certain example embodiments, the coated article shown in FIG. 3 may have the same or similar performance characteristics as those example coatings described above. For instance, in certain example embodiments, some or all of Tvis, Tsolar, a*, b*, L*, etc., may differ by no more than 15% from those shown above, more preferably by no more than 10%, and possibly by no more than 5%.

Bent and laminated articles including coatings according to certain example embodiments of this invention have the following optical characteristics (e.g., when the coating(s) is provided on a clear soda lime silica glass substrate 1 from 1 to 10 mm thick, preferably about 2.1 mm thick). In Table 6, all parameters are measured after bending and laminating.

TABLE 6

Example Optical Characteristics (After Bending and Laminating)

| Characteristic | General | More Preferred | Example |
|---|---|---|---|
| $T_{vis}$ (or TY)(Ill. A, 2°): | >=60% | >=70% or 75% | 72% |
| $a^*_t$ (Ill. A, 2°): | −6 to +6 | −4 to 0 | −3.5 |
| $b^*_t$ (Ill. A, 2°): | −10 to +10.0 | −4 to 0 | −1.30 |
| $L^*_t$: | >=88 | >=90 | 88 |
| $R_f Y$ (Ill. A, 2°): | <=20% | <=15% | 16 |
| $a^*_f$ (Ill. A, 2°): | −5 to +5 | −3 to +2 | 2.4 |
| $b^*_f$ (Ill. A, 2°): | −14.0 to +10.0 | −10.0 to +5 | 2.7 |
| $L^*_f$: | >=30 | >=25 | 47 |
| $R_g Y$ (Ill. A, 2°): | <=20% | <=15% | 14 |
| $a^*_g$ (Ill. A, 2°): | −7 to +7 | −4 to +4 | 3.0 |
| $b^*_g$ (Ill. A, 2°): | −10.0 to +10.0 | −2.0 to +7 | 0.4 |
| $L^*_g$: | >=25 | >=30 | 44 |
| $T_{UV}$ | <=10% | <=3% | <1% |

Figure 4:
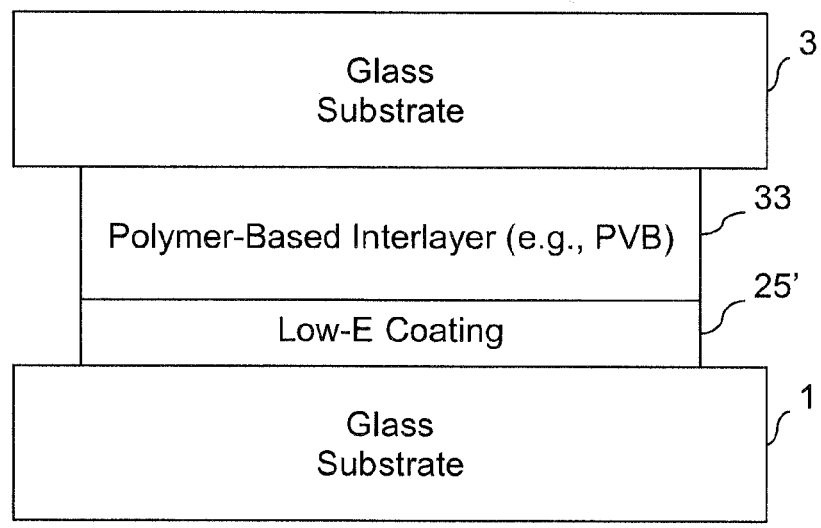
FIG. 4 is a cross-section view of a vehicle windshield according to an example embodiment of this invention.

In certain example embodiments, a coated article (e.g., similar to that shown in FIG. 3) may be prepared by sputter depositing these and/or other layers on a glass substrate. The coated article may be shipped to a fabricator to cut the large coated stock sheet, and smaller sheets may be bent and laminated to one or more other sheets, e.g., as described in connection with FIG. 4. In that regard, FIG. 4 is a cross-section view of a vehicle windshield according to an example embodiment of this invention. As shown in FIG. 4, the substrate 1 supports the coating 25' described above and is laminated to a second substrate 3, e.g., via a polymer-based interlayer 33. The laminating material may be, for example, PET (polyethylene terephthalate), PVB (polyvinyl butyral), EVA (ethylene vinyl acetate), and/or any other suitable material. However, in certain example embodiments, the inclusion of the coating 25' may help to serve UV and/or IR blocking functions, thereby reducing the need for the conventional PET laminating material. This may result in cost savings, as well as a "cleaner" operation inasmuch as PET is sometimes considered difficult to work with. In other words, in certain example embodiments, the first and second substrates may be laminated together using a material that is not PET. The substrates shown in FIG. 4 may be glass substrates in certain example embodiments of any suitable thickness. For instance, in certain example embodiments, the substrates each may be 2.1 mm thick glass substrates. The coating 25' is shown as being located on surface 2 of the windshield. However, in different embodiments of this invention, the coating 25' may be located elsewhere (e.g., on surface 3).

Thus, certain example embodiments of this invention relate to a method of making a vehicle windshield including first and second glass substrates that are laminated together, with the method comprising making a coated article, e.g., in accordance with the FIG. 3 example embodiment, wherein that coated article is adapted for use as the first substrate in the vehicle windshield. As alluded to above, the coated article may be sent to a fabricator so that the coated article can be sized, bent, and laminated to the second substrate.

The FIG. 4 example embodiment as a whole may have a visible transmission greater than or equal to 50%, more preferably greater than or equal to 65%, and sometimes greater than or equal to 70%. Total solar transmission may be kept below about 60%, more preferably below about 55%, and still more preferably below about 50%. Some or all of the performance metrics discussed above in connection with Table 6 thus may also apply to windshield and/or non-monolithic embodiments of this invention.

It is noted that the zirconium-inclusive layer may be provided as the outermost layer in certain example embodiments. It also is noted that the layer stack, excluding the zirconium-inclusive layer, may be repeated one or more times, e.g., to provide a double-, triple, quad-, etc. silver layer stack system.

Although certain example embodiments have been described in connection with aftermarket applications and/or in connection with vehicle windshield applications, the techniques described herein may be used in connection with other applications. For instance, improved durability would be desirable in OEM applications; monolithic, laminated, IG, VIG, and/or other windows/window units, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle windshield, comprising:
   a coating supported by a first glass substrate, the coating comprising, moving away from the first glass substrate:
   a first dielectric layer comprising silicon nitride;
   a first contact layer comprising Ni and/or Cr;
   an infrared (IR) reflecting layer comprising silver located on the substrate over at least and contacting the first contact layer;
   a second contact layer comprising Ni and/or Cr located over and contacting the IR reflecting layer;
   a second dielectric layer comprising silicon nitride located over and contacting the second contact layer; and
   an overcoat layer comprising zirconium oxide; and
   a second glass substrate laminated to the first glass substrate such that the coating supported by the first substrate faces the second substrate,
   wherein the first contact layer is 2.1-2.5 times thicker than the second contact layer, and
   wherein the overcoat layer is at least 2 nm thick,
   wherein the first and second glass substrates are laminated together using a polymer-based interlayer.

2. The vehicle windshield of claim 1, wherein the first contact layer is 2.2-2.4 times thicker than the second contact layer.

3. The vehicle windshield of claim 1, wherein the overcoat layer is 2.5-4 nm thick.

4. The vehicle windshield of claim 1, wherein the first dielectric layer comprising silicon nitride is in direct contact with the first glass substrate.

5. The vehicle windshield of claim 1, wherein the windshield has a visible transmission of at least about 70%.

6. The vehicle windshield of claim 1, wherein the second contact layer is partially nitrided.

7. The vehicle windshield of claim 1, wherein each said layer in the coating is sputter deposited.

8. The vehicle windshield of claim 1, wherein the polymer-based interlayer is PVB.

9. The vehicle windshield of claim 1, wherein the polymer-based interlayer is not PET.

10. The vehicle windshield of claim 1, wherein
the first contact layer is 2.2-2.4 times thicker than the second contact layer, and
the overcoat layer is 2.5-4 nm thick.

11. The vehicle windshield of claim 10, wherein the vehicle windshield has a visible transmission of at least about 70% and a total solar transmission of less than about 50%.

12. The vehicle windshield of claim 11, wherein the vehicle windshield has a UV transmission of less than or equal to about 3%.

13. The vehicle windshield of claim 1, wherein the first and/or second contact layer(s) is/are partially nitrided.

14. The vehicle windshield of claim 1, wherein the overcoat layer further comprises silicon and nitrogen.

15. The vehicle windshield of claim 1, wherein the overcoat layer further comprises silicon.

16. A method of making a coated article including a coating supported by a glass substrate, the method comprising disposing, in order moving away from the glass substrate:
a first dielectric layer comprising silicon nitride;
a first contact layer comprising Ni and/or Cr;
an infrared (IR) reflecting layer comprising silver located on the substrate over at least and contacting the first contact layer;
a second contact layer comprising Ni and/or Cr located over and contacting the IR reflecting layer;
a second dielectric layer comprising silicon nitride located over and contacting the second contact layer; and
an overcoat layer comprising zirconium oxide,
wherein the first contact layer is 2.1-2.5 times thicker than the second contact layer,
wherein the overcoat layer is at least 2 nm thick, and
wherein the coated article does not include any pyrolytically deposited layers.

17. The method of claim 16, wherein the overcoat layer is 2.5-4 nm thick.

18. The method of claim 16, wherein the coated article has a visible transmission of at least about 70% and a total solar transmission of less than about 50%.

19. The method of claim 18, wherein the coated article has a UV transmission of less than or equal to about 3%.

20. The method of claim 16, wherein the first and/or second contact layer(s) is/are partially nitrided.

21. The method of claim 16, wherein each said layer in the coating is sputter deposited.

22. A method of making a vehicle windshield including first and second glass substrates that are laminated together, the method comprising:
making a coated article in accordance with claim 16; and
wherein the coated article is adapted for use as the first substrate.

23. The method of claim 22, further comprising forwarding the coated article to a fabricator so that the coated article can be sized, bent, and laminated to the second substrate.

24. The method of claim 16 wherein the overcoat layer further comprises silicon and nitrogen.

25. The method of claim 16, wherein the overcoat layer further comprises silicon.

26. A method of making a vehicle windshield including first and second glass substrates that are laminated together the method comprising:
making a coated article including a coating supported by a glass substrate, the method comprising disposing, moving away from the glass substrate:
a first dielectric layer comprising silicon nitride;
a first contact layer comprising Ni and/or Cr;
an infrared (IR) reflecting layer comprising silver located on the substrate over at least and contacting the first contact layer;
a second contact layer comprising Ni and/or Cr located over and contacting the IR reflecting layer;
a second dielectric layer comprising silicon nitride located over and contacting the second contact layer; and
an overcoat layer comprising zirconium oxide,
wherein the first contact layer is 2.1-2.5 times thicker than the second contact layer,
wherein the overcoat layer is at least 2 nm thick,
forwarding the coated article to a fabricator so that the coated article can be sized, bent, and laminated to another glass substrate in making the vehicle windshield; and
wherein the vehicle windshield does not use PET.

* * * * *